United States Patent [19]

Breckinridge et al.

[11] Patent Number: 4,523,846
[45] Date of Patent: Jun. 18, 1985

[54] INTEGRATED OPTICS IN AN ELECTRICALLY SCANNED IMAGING FOURIER TRANSFORM SPECTROMETER

[75] Inventors: James B. Breckinridge, La Canada; Fred G. O'Callaghan, Mission Viejo, both of Calif.

[73] Assignee: The United States of America as represented by the Administrator of the National Aeronautics and Space Administration, Washington, D.C.

[21] Appl. No.: 416,443

[22] Filed: Sep. 10, 1982

[51] Int. Cl.$^3$ .............................................. G01B 9/02
[52] U.S. Cl. .................................... 356/346; 356/353
[58] Field of Search ................................ 356/346, 353

[56] References Cited

U.S. PATENT DOCUMENTS

| | | | |
|---|---|---|---|
| 3,684,379 | 8/1972 | Girard | 356/346 |
| 3,702,735 | 11/1972 | Potter, Jr. | 250/330 X |
| 4,132,940 | 1/1979 | Schindler | |

OTHER PUBLICATIONS

Specification Sheet: RCA Charge-Coupled Devices.
Specification Sheet: Fairchild Semi-Conductor CCD211 Charge-Coupled Device.
Spectrometric Techniques, vol. II, G. A. Vanasse, editor. Academic Press, 1977, pp. 80, 81, 90, 91, 195.
"The Spatial Structure Analyzer and Its Astronomical Applications" Ph.D. Dissertation in Optical Science, U. of Arizona, 1976, pp. 111–115.
"A Two Dimensional White-Light Amplitude Interferometer", Int'l. Astronomical Colloquium No. 50, Proceedings: A High Resolution Stellar Interferometry, Univ. Md., pp. 31-1 to 31-13, Sep. 1978.
"A White-Light Amplitude Interferometer with 180-Degree Rotational Shear", *Optical Engineering*, vol. 17, No. 2, Mar. 1977, pp. 156–159, 1978.
"Two Dimensional White Light Coherence Interferometer", *Applied Optics*, vol. 13, No. 12, Dec. 1974, pp. 2760–2762.
*Spectrometric Techniques*, vol. I, G. A. Vanasse, editor. Academic Press, 1981, Chapter 2.

*Primary Examiner*—Davis L. Willis
*Assistant Examiner*—Matthew W. Koren
*Attorney, Agent, or Firm*—Paul F. McCaul; John R. Manning; Thomas H. Jones

[57] ABSTRACT

State of the art Fourier transform spectrometers are useful scientific tools. But, they are very complex precision electro-optical-mechanical instruments. To simplify the instrument, the need for a mechanical slide mechanism to create a path difference has been eliminated by the use of retro-reflecting mirrors (16, 18) in a monolithic interferometer assembly (11) wherein the mirrors (16, 18) are not at 90 degrees to the propagation vector (29, 43) of the radiation (27), but rather at a small angle (49). The resulting interference fringes (51, 53) create a double-sided interferogram (33) of the source irradiance distribution which is detected by a charge-coupled device (CCD) array (23). The position of each CCD pixel (25) in the array is an indication of the path difference between the two retro-reflecting mirrors (16, 18) in the monolithic optical structure. The Fourier transform of the signals generated by the CCD array (23) provide the spectral irradiance distribution of the source. For imaging, the interferometer assembly (11) scans the source of irradiation by moving the entire instrument, such as would occur if it was fixedly mounted to a moving platform, e.g., a spacecraft. During scanning, the entrance slot (21) to the monolithic optical structure send different pixels to corresponding interferograms detected by adjacent columns of pixels at the CCD array (23).

9 Claims, 3 Drawing Figures

INTEGRATED OPTICS IN AN ELECTRICALLY SCANNED IMAGING FOURIER TRANSFORM SPECTROMETER

BACKGROUND OF THE INVENTION

This invention relates to Fourier transform spectrometers and specifically to a new optical interferometer mechanism for use therein.

The Fourier transform spectrometer has become a useful tool for scientific remote sensing of earth and planetary atmospheres. Use of the Fourier transform spectrometer for these purposes is described in "Fourier Spectroscopy in Planetary Research," an article written by R. A. Hanell and V. G. Kunde in *Space Science Review*, Vol. 18, pp. 201–256, 1975. However, Fourier transform spectrometers are very complex precision electro-optical-mechanical instruments. They require a mechanical slide mechanism that will move with optical interferometer stability. This requirement for stability has resulted in systems that are very large and heavy. Even so, they are still sensitive to tilt misalignments. The problems encountered in designing a stepping interferometer for Fourier spectrometers are set out in *Spectrometric Techniques*, Vol. II, Chapter 2, "First-Order Optical Design for Fourier Spectrometers," J. B. Breckinridge and R. A. Schindler, edited by G. A. Vanesse, Academic Press, 1981.

As a result of its complexity and sensitivity, Fourier spectrometers have been used sparingly in spaceflight applications where precision spectro-radiometric measurements are required. Attempts have been made to reduce the instrument's sensitivity to acceleration and the sampling errors introduced as a result of the nonuniformity of the mechanical scanning system. See U.S. Pat. No. 4,132,940, issued to Rudolf A. Schindler on Jan. 2, 1979. However, the problems inherent in a mechanical stepping scheme have not been solved.

Accordingly, the present invention contemplates an entirely new configuration for an interferometer which avoids most of the difficulties inherent in prior art mechanical scanning interferometers. The present invention results in an entirely new generation of efficient, lightweight, stable infrared remote radiometer measurement systems.

SUMMARY OF THE INVENTION

The present invention provides higher quality data and exhibits improved alignment stability over prior art Fourier transform spectrometers. It functions in an acceleration environment, i.e., spacecraft. It is simpler in operation, lighter and more rugged than prior Fourier transform spectrometers. These improvements are the result of a monolithic interferometer assembly having retro-reflecting mirrors that are not at a 90 degree angle to the propagation vector of the radiation. This tilt effectively provides the path differences in the two arms of the interferometer. The resulting interference fringes are detected by a CCD array wherein the position of each element of the array is an indication of path length. This invention eliminates physical movement to obtain the propagation path difference needed to create the varying fringe patterns in prior art devices.

BRIEF DESCRIPTION OF THE DRAWINGS

The exact nature of this invention as well as other advantages thereof will be readily apparent from consideration of the following specification related to the annexed drawings in which like reference numerals designate like parts throughout the figures thereof, and wherein.

DESCRIPTION OF THE PREFERRED EMBODIMENT

Figure 1:
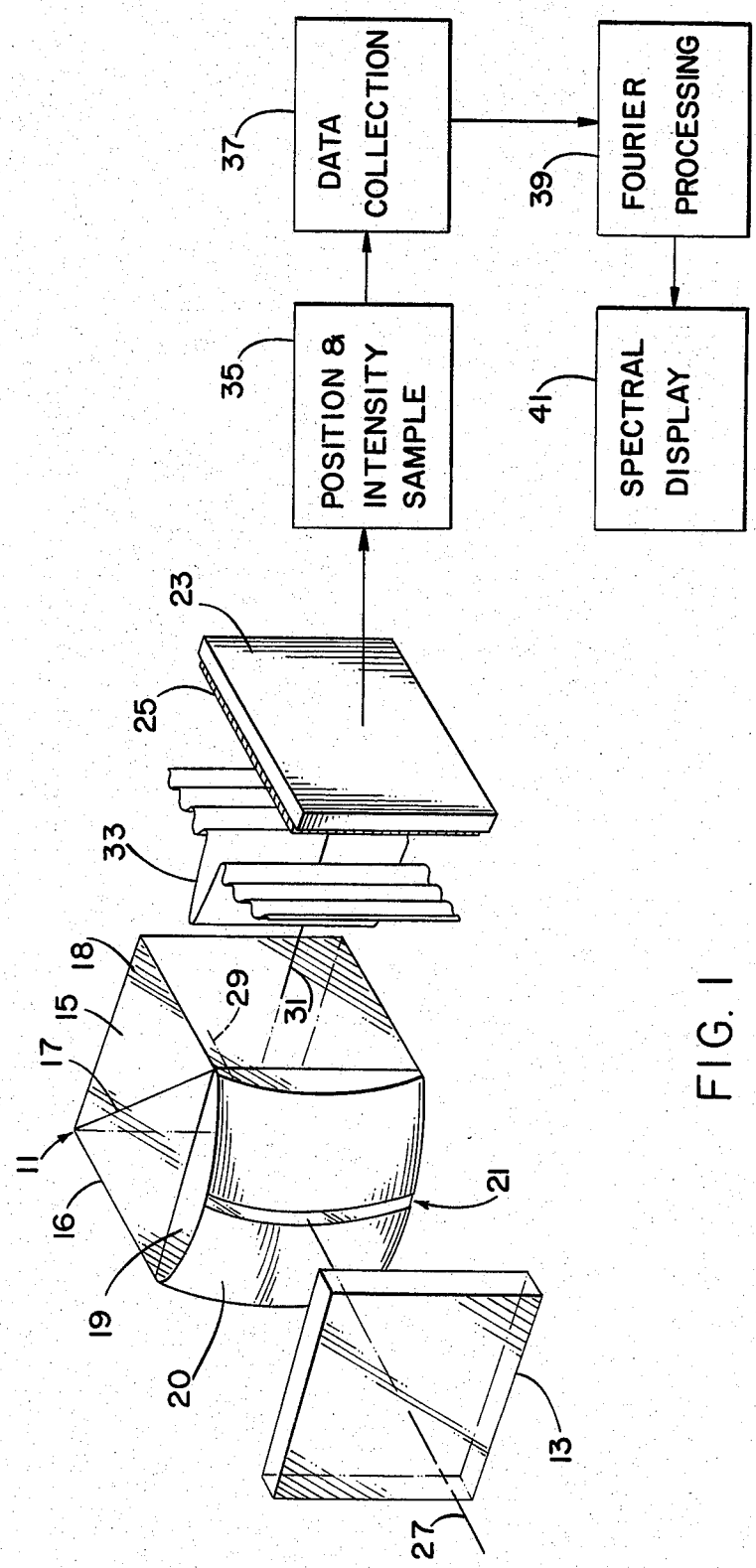
FIG. 1 is a perspective and block diagram illustration of an interferometer mechanism of the present invention.

FIG. 1 diagramatically illustrates a Fourier transform spectrometer which is utilizing an interferometer mechanism 11 built according to the present invention. The interferometer mechanism 11 is shown in perspective while the electronics of the spectrometer is shown in block diagram form.

The interferometer mechanism, according to the present invention, utilizes integrated optics whereby the entrance lens 19, beamsplitter 17, and the two mirror reflecting surfaces 16 and 18 are all formed as one block of optical material. The technique by which the mechanism 11 may be manufactured is described in an article entitled "Two-Dimensional White Light Coherence Interferometer38 by James B. Breckinridge, *Applied Optics*, Vol. 13, p. 2760, November 1974, and an article entitled "A White-Light Amplitude Interferometer with 180-Degree Rotational Sheer" by James B. Breckinridge, *Optical Engineering*, Vol. 17, No. 2, March 1978.

The lens 19 of the interferometer is coated with an opaque aluminum film, by standard deposition techniques, to form an entrance slot 21 from top to bottom of the integrated optic cube 15. The lens 19 is curved so that it functions as a power element or field lens for the interferometer. The field lens 19 relays the system pupil onto the retro-reflecting mirrors of the interferometer 11 through a beamsplitter 17 that is actually a part of the optic cube 15. Radiation 27 enters the system through slot 21. Some of that radiation 29 passes through the beamsplitter 17 to retro-reflecting mirror 18. The radiation reflected by beamsplitter 17 to retro-reflecting mirror 16 is not shown in FIG. 1.

Both radiation beams are reflected back to the beamsplitter 17, interference recombined as indicated by beam vector 31 into a two-dimensional wavefront 33. This fringe field is sensed by a two-dimensional array detector 23 which, for example, could be made up of a matrix of charge coupled devices 25.

Image sensors utilizing charged-coupled devices are well known in the art. For example, CCD211 is a 244×190 element image sensor manufactured by Fairchild Semiconductor. A silicon imaging device which comprises a 512×320 pixel image sensor is made by RCA.

As is well known, the Fourier transform of the sensed source irradiance distribution is the spectral irradiance distribution of that source. The processing technique is standard in the art and is described in *Spectrometric Techniques*, Vol. 1, edited by George A. Vanasse, Academic Press, 1977. Accordingly, the position and intensity sample generated by the CCD array image sensor 23 is determined by circuitry 35 which then provides it to a storage facility 37, such as a memory. The storage facility, when called upon to do so, provides it to equipment that performs the Fourier processing 39. The result is the spectral distribution of the source irradiance that can be displayed on an appropriate device 41, i.e., printer or CRT.

The system, according to the present invention requires no moving parts. It does not utilize a mechanism to physically step one of the retro-reflecting mirrors 16 or 18. The only prior art system for an interferometer which involves no mechanically moving parts of which applicant is aware, is disclosed in *Spectrometric Techniques, Vol. I*, edited by George A. Vanasse, Academic Press, 1977, p. 91. This device encases a cubic beamsplitter and the two retroreflecting mirrors in a controlled gas environment. The interferometer is stepped by slowly filling the space between the beamsplitter and the two mirrors with gases of different indices of refraction at the same pressure. In contrast to this prior art device, the preferred embodiment of the present interferometer cube 15 is solid and uncomplicated. It does not require an intricate gas control system for varying the gas pressure of two different gases between the beamsplitter and the two mirrors.

Figure 2:
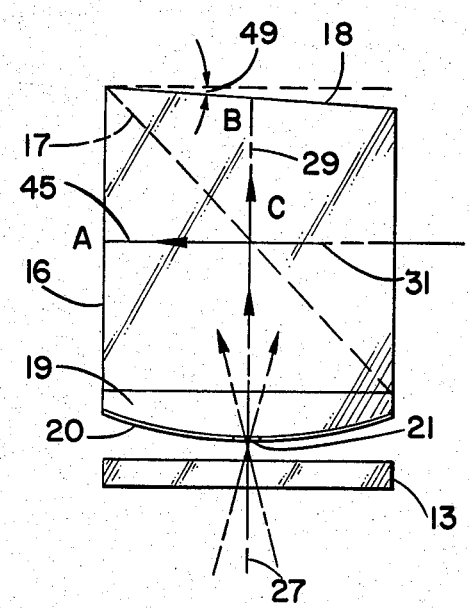
FIG. 2 is a graphic illustration of the wavefront interaction occurring in the interferometer mechanism of the present invention.

How the path difference is obtained according to the present invention will be described with reference to FIG. 2. FIG. 2 is a schematic illustration of the reflection path length between beam 24 that is transmitted through the beamsplitter 17 and beam 45 that is reflected by the beamsplitter 17. At least one of the retro-reflecting mirrors, in this case retro-reflecting mirror 18, is placed at a small angle 49 to the normal of beam 29. Retro-reflecting mirror 18 is placed so that the path length CB of beam 29 at the center is equal to the path length CA of beam 45 at the center. The distances from the center of the beam-splitter 17, at C, to other points on the mirror surface 18 is either less than, or greater than the distance from C to mirror surface 16. This is the configuration for the interferogram shown in FIG. 3, as an example. This equal path position may be placed anywhere within the field of view of the interferogram to satisfy any particular requirement.

The two wavefronts generated by the retro-reflecting mirrors 16 and 18 are shown as wavefront 51 which is reflected from retro-reflecting mirror 16, and wavefront 58 which is reflected from retro-reflecting mirror 18. Wavefront 58 is tilted, by a small angle, α with respect to wavefront 51. This angle is twice the angle 49 of retro-reflecting mirror 18. The interference combination of wavefront 51 and 58 results in the interference wavefront 33. This interference is sensed by the image sensor 23 which has a plurality of CCD elements 25 arranged in columns and rows.

The tilt-angle 49 for retro-reflecting mirror 18 is small and works in combination with the optical filter 13 which is a low-frequency pass (long wavelength pass) filter in order to create the nonoverlapping interference fringes or wavefront 33 at the output 31 of the interferometer.

The path lengths in each arm of the interferometer CB and CA are adjusted to be equal so that the white-light interference fringe is at the center. The technique for aligning the two retro-reflecting surfaces so that the white-light interference fringe is at the center is described in "The Spatial Structure Analyzer and Its Astronomical Applications" by James B. Breckinridge, a Ph.D. dissertation, published in 1976 and obtainable from University Microfilms International, 300 North Zeeb Road, Ann Arbor, Michigan 48106; and in "A Two-Dimensional White-Light Amplitude Interferometer" by James B. Breckinridge a paper presented at the International Astronomical Union Colloquium No. 50, Proceedings: High Resolution Stellar Interferometry, University of Maryland, pp. 31-1 to 31-13, September 1978.

Figure 3:
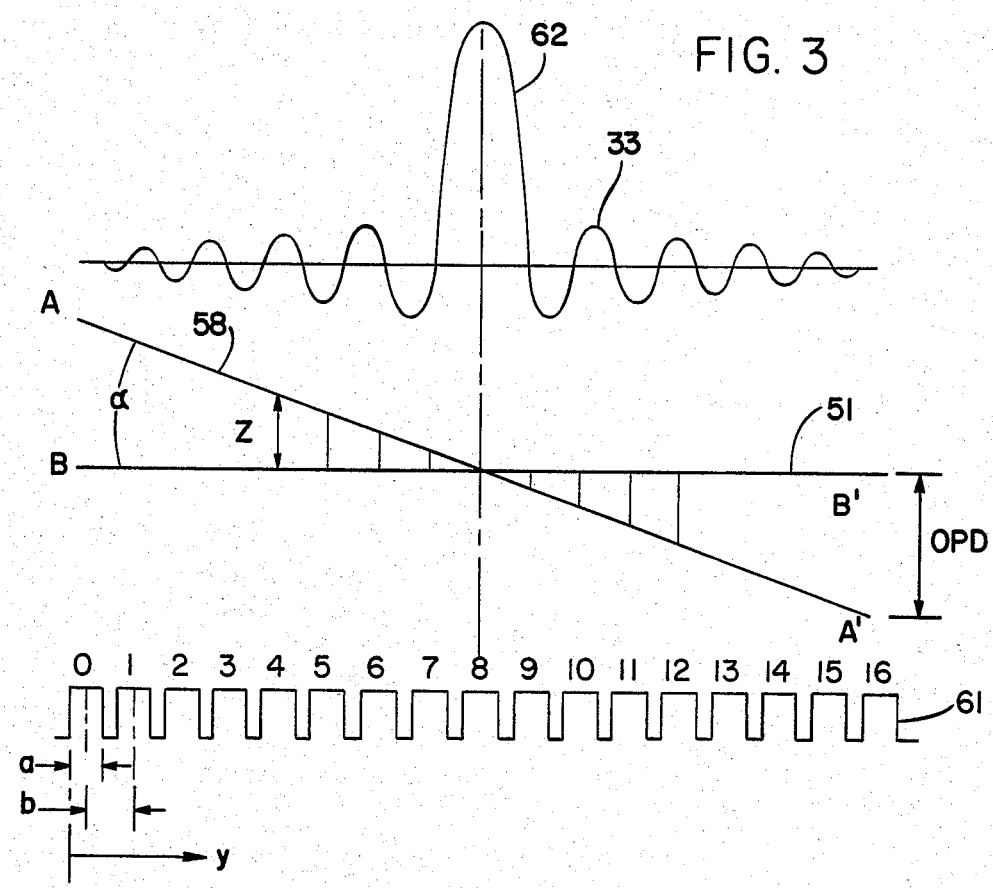
FIG. 3 is an idealized illustration of the interaction between the two wavefronts to create an interference wavefront and the sampling thereof.

An analysis of the sampling of the interference fringe 33 by a discrete element array 25 will now be provided with reference to FIG. 3.

The integrated optics interferometer mechanism of the Fourier transform spectrometer according to the present invention creates the fringe field 33 by interfering two plane waves 51 and 58. These two waves, labeled $AA^1$ and $BB^1$, interfere with angle α, between their normals, to form a fringe pattern 33 across a detector which has a linear array of detector elements of width "a", separated by a center-to-center separation of "b", and covering a linear expanse given by "Nb", where N is the number of detector elements. Pulse train 61 of FIG. 3 indicates column sampling of the linear array 23.

Two configurations of wavefront interaction will be analyzed. The first is with the white-light fringe 62 centered as shown, in FIG. 3. The other is with the white-light fringe off center.

In FIG. 3 we see that the optical path difference (OPD) (in units of length) shown by z is a function of y, a distance along the detector array. If the length of the detector is Nb then the OPD as a function of y is given by $$OPD = \alpha y$$

and the OPD for a particular detector element j numbered left to right in FIG. 3 is $$(OPD)_j = \alpha \left[ \frac{Nb}{2} - j \cdot b \right] \quad \text{(Equation 1)}$$

Recall that j runs from O to N. In linear systems parlance, the array detector is represented by $$(y) = \sum_{j=0}^{N} \left[ \text{Rect}\left(\frac{Y}{a}\right) \oplus \delta(y - jb) \right] \quad \text{(Equation 2)}$$

where S (y) is the distribution of sensor area.

In order to sample the spectrum without aliasing, it is necessary to have two detector elements for each fringe cycle of the shortest wavelength (highest frequency) light on the focal plane.

We will first consider sampling at this Nyquist spatial frequency (two detector elements for each fringe cycle). Also, we first consider each detector element to be infinitely narrow, proceed with the analysis, and then correct the answer by multiplying the spectrum (Fourier transform of the interferogram) by the Fourier transform of the detector element of finite width. The sensor is then, $$S(y) = \sum_{j=0}^{N} [\delta(y - jb)] \quad \text{(Equation 3)}$$

Let the source radiation be centered at $\lambda_o$ and extend from a short wavelength end of $\lambda_1$ to a long wavelength end of $\lambda_2$.

From FIG. 3, we see that the spacing of the fringes of wavelength $\lambda_1$ across the sensor plane, for a wavefront tilt of $\lambda$ with light of wavelength $\lambda_1$ is:

$$\Delta y = \lambda_1/(2\alpha) \qquad \text{(Equation 4)}$$

In the notation used in FIG. 3, then $$b = \lambda_1/(2\alpha) \qquad \text{(Equation 5)}$$

The detector modeled as an array of delta functions is $$S(y) = \text{rect}\left(\frac{Y}{Nb}\right) \cdot \sum_{j=0}^{\infty} [\delta(y - jb)] \qquad \text{(Equation 6)}$$

with $b = \lambda_1/(2\alpha)$. The signal recorded $R(y)$ is the interferogram $I(y)$, times the sensor function $S(y)$, or $$R(y) = I(y) \cdot S(y) \qquad \text{(Equation 7)}$$

Recognizing that $I(y)$ is the Fourier transform of $\widetilde{I}(\sigma)$ [intensity as a function of wavenumber], we can write $$\widetilde{R}(\sigma) = \widetilde{I}(\sigma) \oplus \widetilde{S}(\sigma) \qquad \text{(Equation 8)}$$

and if $S(y)$ is sampled at the Nyquist frequency.

$$\widetilde{R}(\sigma) = \widetilde{I}(\sigma) \qquad \text{(Equation 9)}$$

The finite width of the detector element, given by a in the function Rect (y/a) in Equation 2, will appear in Equation 9 as a multiplicative factor. In other words, the Fourier transform of Rect (y/a) which is a sine function will apodize the spectrum with a multiplicative factor. This apodization factor is a measurable and stable part of the instrument and therefore a calibration can be made and the instrumental profile corrected.

As a practical example, let's consider a 128 element array with 100 micron pixels separated by 150 microns. The array length is then 19.2 millimeters long. In FIG. 3, let the OPD be 2 millimeters or 2.0 cm. The spectral resolution is then 5 cm$^{-1}$. If the white-light fringe is centered on the fringe field which is projected onto the detector array, then we have 64 detectors on each side of the white-light fringe and from $$\frac{\alpha}{d\sigma} = 2n,$$

where n = the number of detector elements or 2n = 32 and the resolution $d\sigma = 5$ cm$^{-1}$, the shortest wavenumber is $$\sigma = (2n) d\sigma \text{ or } \sigma = 160 \text{ cm}^{-1}.$$

This is very long infrared, and represents the shortest wavenumber that can be sampled without aliasing, and without using a filter over the input.

As another practical example, move the white-light fringe to one end of the interferometer fringe field, and use a detector with 2048 elements, each detector element of sensitive length 30 microns with a 20 micron gap to give a spacing of 50 microns. The detector length is then 10.2 cm. A reasonable angle, $\alpha$, is 0.05 radians. The optical path difference or retardation of the interferometer is then $(0.05)(10.2) = 0.51$ cm. From the equation $d\sigma = 1/\text{OPD}$, $d\sigma = 2$ cm$^{-1}$ and the spectral resolution is 2 cm$^{-1}$ which is uniform over the entire spectral region.

The longest wavenumber or shortest wavelength that one can observe without aliasing is given by that wavelength which appears across the detector to give a fringe pattern of such a spacing that two detector elements must cover one fringe cycle. All wavelengths longer than this will have their fringe cycles sampled by at least two detector elements and therefore the spectral information will not be lost or confused through aliasing in the spectrum. Aliasing is not a serious limitation since bandpass filters will control effect and these filters are well developed for this region of the spectrum.

With an angle of 0.05 radians, the cutoff, or shortest wavelength that one can observe without aliasing, $\lambda_c$, is given by $\lambda_c = (\Delta y)(2)(\alpha)(50)(2)(0.05) = 5$ microns or 2,000 cm$^{-1}$.

Note that if the prisms are made from transparent materials whose index of refraction varies as a function of refractive index, then because of the optical path difference changes across the detector (required to create the interferogram fringes), there is an optical phase term which varies from detector element to detector element. This phase term is zero at the white-light fringe. This phase factor is a measurable and stable part of the instrument and therefore a calibration can be made and the instrumental profile corrected.

In order to perform imaging with this interferometer, the entire instrument is scanned, push-broom style, by mounting it on a moving platform, such as a spacecraft, to scan the horizon. The slot 21 then causes the different interferograms to be displayed over adjacent columns of pixels at the array detector 23. In other words, the scanned image Fourier transform spectrometer according to the present invention operates much like an imaging radar.

From the foregoing, it can be seen that a new imaging Fourier transform spectrometer has been invented which is electronically scanned by parallel readout of the detector elements rather than using the traditional scanning techniques such as described in *Spectrometric Techniques*.

Systems have been devised which provide mirror surfaces at non-normal angles to the beamsplitter. See *Spectrometric Techniques, Vol. I*, pp. 80, 81. However, this is the first integrated optics electronically scanned, imaging Fourier transform spectrometer in the art.

It should be understood, of course, that the foregoing disclosure relates only to the preferred embodiment of the invention and that numerous modifications may be made therein without departing from the spirit and scope of the invention as set forth in the appended claims.

What is claimed is:

1. In an imaging Fourier transform spectrometer, an improved interferometer mechanism wherein the optical path difference between the retroreflecting mirrors is obtained electronically, without physical movement of the retro-reflecting mirrors, said interferometer mechanism comprising:

an opaque lens means having a light transmissive slot therein placed in the path of a source of radiation for relaying an image of a pupil;

a beam splitter means placed in the path of the radiation passing through the slot in said lens for creating a first and second wavefront;

an optically reflective cube fixed in position relative to said path of radiation passed through the slot in said lens, said cube having:

a first mirror surface placed in the path of the first wavefront from the beam splitter, at an optical path distance CA at the first mirror surface;

a second mirror surface placed in the path of the second wavefront from the beam splitter at an optical path distance of CB at the second mirror surface, CB having a fixed optical path difference relative to CA, said second mirror surface being at an angle to its wavefront that is different from the angle made by the first mirror surface to its wavefront; and a two-dimensional pixel detector array means comprised of a plurality of detector elements in a grid placed normal to the path of the interference fringe wavefront from said beam splitter for electronically sensing the fringe field free of any mechanical movement relative to said optical cube, the location of each detector element in one direction being an indicator of optical path difference between said first and second mirror surfaces, the location of each detector element in the other direction corresponding to a pixel of spatial information.

2. The improved interferometer mechanism of claim 1 wherein said lens comprises:

a curved outward face directed to the radiation source; and an opaque aluminum film deposited on said face except for a slot having its longer axis approximately perpendicular to the top and bottom of said curved face.

3. The improved interferometer mechanism of claim 2 wherein said lens, said beam splitter, and said first and second mirror surfaces are formed into a single monolithic assembly.

4. The improved interferometer mechanism of claim 1 wherein said lens, said beam splitter and said first and second mirror surfaces are formed into a single monolithic assembly.

5. The improved interferometer mechanism of claim 1 wherein said first wavefront is reflected by said beam splitter to intercept said first mirror surface and be reflected therefrom normal to the surface.

6. The improved interferometer mechanism of claim 1 wherein said second wavefront is transmitted through said beam splitter to intercept said second mirror surface and be reflected therefrom at an angle normal to the surface of said second mirror.

7. The improved interferometer mechanism of claim 6 wherein said lens, said beam splitter and said first and second mirror surfaces are formed with a single monolithic assembly.

8. The improved interferometer mechanism of claim 7 wherein said lens comprises:

a curved outward face directed to the radiation source; and an opaque aluminum film deposited on said face except for a slot having its longer axis approximately perpendicular to the top and bottom of said curved face.

9. The improved interferometer mechanism of claim 1 further comprising an optical low-frequency pass filter positioned in front of said lens at the slot to filter radiation from the source.

* * * * *